United States Patent [19]
Lee et al.

[11] Patent Number: 5,710,806
[45] Date of Patent: Jan. 20, 1998

[54] TELECOMMUNICATIONS DEVICE FOR THE HEARING IMPAIRED WITH TELEPHONE, TEXT COMMUNICATION AND ANSWERING, AND AUTOMATED VOICE CARRYOVER

[75] Inventors: Peter Lee; Phuong Le Pham, both of Huntington Beach; George Cheung, La Mirada, all of Calif.

[73] Assignee: Ameri Phone, Inc., Garden Grove, Calif.

[21] Appl. No.: 310,345

[22] Filed: Sep. 22, 1994

[51] Int. Cl.$^6$ .................................................. H04M 11/00
[52] U.S. Cl. .................................................. 379/96; 379/52
[58] Field of Search .................................. 379/52, 93, 96, 379/97, 201, 416; 381/83, 93

[56] References Cited

U.S. PATENT DOCUMENTS

| | | | |
|---|---|---|---|
| 4,503,288 | 3/1985 | Kessler | 379/96 |
| 4,511,764 | 4/1985 | Nakayama et al. | 379/96 |
| 4,532,378 | 7/1985 | Nakayama et al. | 379/96 |
| 4,817,160 | 3/1989 | De Koning et al. | 381/83 |
| 4,926,459 | 5/1990 | Advan et al. | 379/52 |
| 5,432,837 | 7/1995 | Engelke et al. | 379/52 |

FOREIGN PATENT DOCUMENTS

| | | | |
|---|---|---|---|
| 0067502 | 6/1977 | Japan | 381/83 |
| 089006877 | 7/1989 | WIPO | 379/416 |

*Primary Examiner*—Stella Woo
*Attorney, Agent, or Firm*—G. Donald Weber, Jr.

[57] ABSTRACT

A telecommunication device for the hearing impaired having the capability of sending text communications via a telephone-style keypad and receiving text communications for display on an LCD display in addition to providing standard telephone voice communications. The telecommunications device automates voice carryover (VCO) calls and for provides automatic answering and recording capability for text messages on the same telephone line as a voice answering machine and or a facsimile machine. The telecommunications device further includes means for selectively adjusting the amplification of received voice messages and sent voice messages to provide maximum amplification of said received voice messages without producing feedback oscillation or to provide maximum amplification of sent voice messages without producing feedback oscillation. The telecommunications device further including means for minimizing effect of the reflected impedance of the telephone line on signal transmission and optimizing the coupling of signals to the telephone line.

21 Claims, 8 Drawing Sheets

TELECOMMUNICATIONS DEVICE FOR THE HEARING IMPAIRED WITH TELEPHONE, TEXT COMMUNICATION AND ANSWERING, AND AUTOMATED VOICE CARRYOVER

BACKGROUND

1. Field of the Invention

The present invention relates in general to telecommunication devices for the hearing impaired and in particular to a telecommunications device for the hearing impaired having the capability of sending text communications via a telephone-style twelve-key keypad and receiving text communications for display on an LCD display in addition to providing standard telephone voice communications. The invention relates especially to such a telecommunication device specifically adapted for voice carryover (VCO) calls and for providing answering machine capability for text messages.

2. Prior Art

Hearing-impaired persons use teletypewriters (TTYs) to communicate over telephone lines. These teletypewriters, called TDDs when specifically for the hearing-impaired person, communicate over the telephone lines in Baudot code, although some machines have the capability of communicating in ASCII code, in addition to Baudot code. A TDD typically has a typewriter style keyboard for entry of information and a display for presenting information entered by the TDD user or transmitted by the TDD or received from other TDDs.

Although TDDs facilitate text communication over telephone lines, they are limited in fulfilling the wide range of telecommunication needs of hearing-impaired persons and the households of hearing-impaired persons. Hearing-impaired individuals have differing degrees of hearing impairment and often are part of households that include persons having normal hearing capabilities. A hearing impaired individual may be able to communicate clearly by speaking but may not hear well enough to comprehend voice transmissions or may comprehend voice transmissions only partially.

A common situation is presented when a hearing-impaired person has the ability to speak but does not hear well enough to communicate over a voice telephone. For many reasons, such a hearing impaired person often desires to speak directly to the other party over the voice telephone, but receive the response from the other party via a text message.

In the U.S. (and many other countries), a relay service has been implemented for specific geographical areas to enable a person having access to only a voice telephone to communicate with a hearing-impaired person through a TDD. In the relay service, a voice telephone connection is established between an operator of the relay service and the voice telephone of the hearing party and a TDD-to-TDD text link is established between a TDD of the relay service and the TDD of the hearing-impaired party. The relay service operator or communication assistant will then relay voice messages (conversation) from the speaking party by text transmission to TDD of the hearing impaired person. Correspondingly, the TDD text messages from the hearing impaired party are relayed by voice by the communication assistant to the voice telephone.

The relay service has recently been improved to provide a voice carryover (VCO) capability for hearing-impaired individuals who wish to talk directly to the other party. In a VCO call, the person with hearing loss dials the number of the relay service and, when the communication assistant answers via a text transmission, the person with hearing loss transmits a text message indicating that he wishes to make a VCO call. Upon receiving an acknowledging reply from the communication assistant, the caller communicates the telephone number to be called. The telephone number to be called may be communicated via a text transmission or by speaking directly with the communication assistant. Once the VCO call is established by the communication assistant, the person with hearing loss speaks directly to the other party. The other party speaks directly to the communication assistant who types the response on his TDD and transmits the message as text to the TDD of the hearing-impaired person.

Since the VCO call is established through text communication, the foregoing procedure is somewhat involved. The multiple key strokes involved in conjunction with the multiple communications makes this VCO call set up a time consuming and inconvenient process. There is a need to expedite this procedure for establishing a VCO call.

Hearing-impaired individuals, particularly those who do not have typing skills, are often uncomfortable using the standard TDD keyboard or may even find it intimidating. They often would prefer that the text transmission device look like a telephone and not have the sometimes imposing presence of a TDD keyboard. This may be particularly true in the case where the telephone communication device is used in a household which has both hearing-impaired and nonhearing-impaired members. There is a need for a telecommunications device having a simple and convenient capability to transmit and receive TTD signals without requiring the use of a TDD typewriter style keyboard.

As noted earlier, hearing impaired individuals have differing individual capacities for both hearing and speaking. Although hearing-impaired individuals usually need a greater receiver volume than available on conventional telephones not designed for the hearing impaired, the amount that the volume of the received voice signal can be amplified is limited because of disruptive feedback received through the telephone's microphone. In a second situation, a hearing-impaired user may have a weak speaking voice and amplification of his or her voice signal is desirable. However, this amplification at the telephone microphone may also generate disruptive feedback since this amplification is also applied to any signals picked up by the telephone microphone including those from the telephone receiver. There is a need to provide greater amplification to compensate for the individual hearing and speaking capabilities of the hearing impaired individuals while limiting the possibility of disruptive feedback.

The greater amplification required to compensate for hearing or speech impairments makes the reflected impedance of the telephone line more critical in the operation of the telecommunications device and also increases the need to minimize the coupling of the device output signals (especially voice signals which are subject to the additional amplification) to the handset receiver. There is accordingly a need to minimize the effect of this reflected impedance as part of optimizing the transmission of the voice signals.

In the case of households which have both hearing-impaired and nonhearing-impaired members, both the hearing-impaired and the nonhearing-impaired have a need to record messages received over the telephone when they are not available to answer the telephone or TDD. Most voice answering machines cannot record TDD messages because they do not recognize the tones transmitted by the TDD and, even if they did, the message would have to be played back with a TDD. Similarly, TDDs may automatically answer and record text messages, but they cannot generally record voice messages and are generally incompatible with voice answering machines connected on the same telephone line. There is accordingly a need to provide a TTY answering machine that is compatible with a voice answering machine and may therefore be used on the same telephone line with a voice answering machine. Facsimile machines have also become quite common and may be used in households having both TDDs and voice answering machines. There is accordingly a need to provide a TTD answering machine that may be used on the same telephone line with a voice answering machine and/or a facsimile machine.

The telecommunications device of the present invention is directed to providing a single device that addresses the foregoing needs.

SUMMARY OF THE INSTANT INVENTION

It is therefore an object of the present invention to provide a telecommunications device capable of communicating by both voice and text transmissions.

Another object of the present invention is to provide such a telecommunications device having the appearance of a telephone.

Another object of the present invention is to provide such a telecommunications device which does not use a standard TDD keyboard for entering text data to be transmitted.

Another object of the present invention is to provide such a telecommunications device having a standard twelve-key telephone keypad which selectively operates as a telephone keypad and a TDD keyboard.

Another object of the present invention is to provide a simple and convenient method of entering TDD text characters with a standard twelve-key telephone keypad into a telecommunications device for transmitting said text characters over a telephone line.

Yet another object of the present invention is to provide such a telecommunications device having a display for displaying data entered through said keypad and text transmissions sent or received.

Another object of the present invention is to provide a telecommunications device which may simultaneously receive a voice transmission and an accompanying text transmission.

Another object of the present invention is to provide telecommunications device for the hearing impaired which facilitates VCO calls.

Another object of the present invention is to provide a simple and convenient method of establishing a VCO connection between such a telecommunications device and relay service.

Another object of the present invention to establish a VCO connection between a telecommunications device and a relay service by either one or two control keypresses of said keypad.

A further object of the present invention is to automatically send a predetermined VCO message to a relay service upon completion of the connection between the communications device and the relay service.

Still another further object of the present invention is to provide for recording text messages received by a telecommunications device.

Another object of the present invention is to provide a telecommunications device for recording text messages which operates on a single telephone line with a conventional voice answering machine for recording voice messages and/or a facsimile machine.

Yet another object of the present invention is to provide a telecommunications device in which provides selectable amplification to compensate for the needs of hearing-impaired individuals having differing amounts of hearing and speech impairments.

Another object of the present invention is to optimize the transmission of voice signals by minimizing the effect of the reflected impedance of the telephone line and minimizing the coupling of text and voice ouput signals to the device receiver.

Briefly, these objects are provided by a microprocessor-based telephone-like telecommunications device employing a telephone-style keypad for entering data, a plurality of additional keys for entering control signals, and an LCD display. Under the control of the microprocessor, the telecommunications device provides programmed operations to simplify the accomplishment of various voice and TTY operations by a hearing impaired person.

Other objects, advantages, and features of the present invention will become apparent from the following detailed description of the preferred embodiment of the invention when considered in conjunction with the accompanying drawings wherein:

DESCRIPTION OF A PREFERRED EMBODIMENT

Figure 1:
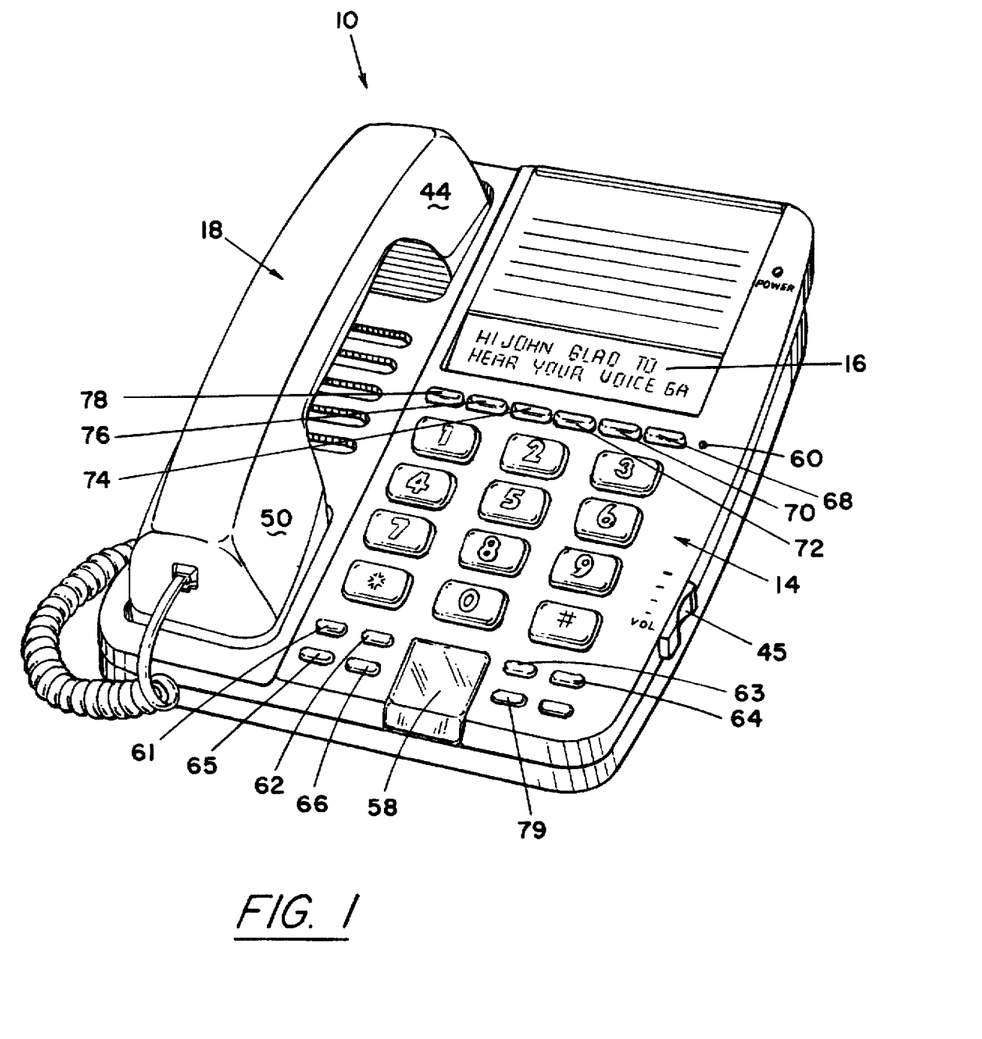
FIG. 1 is a pictorial view of a preferred embodiment of the telecommunications device according to the present invention.
Figure 2:
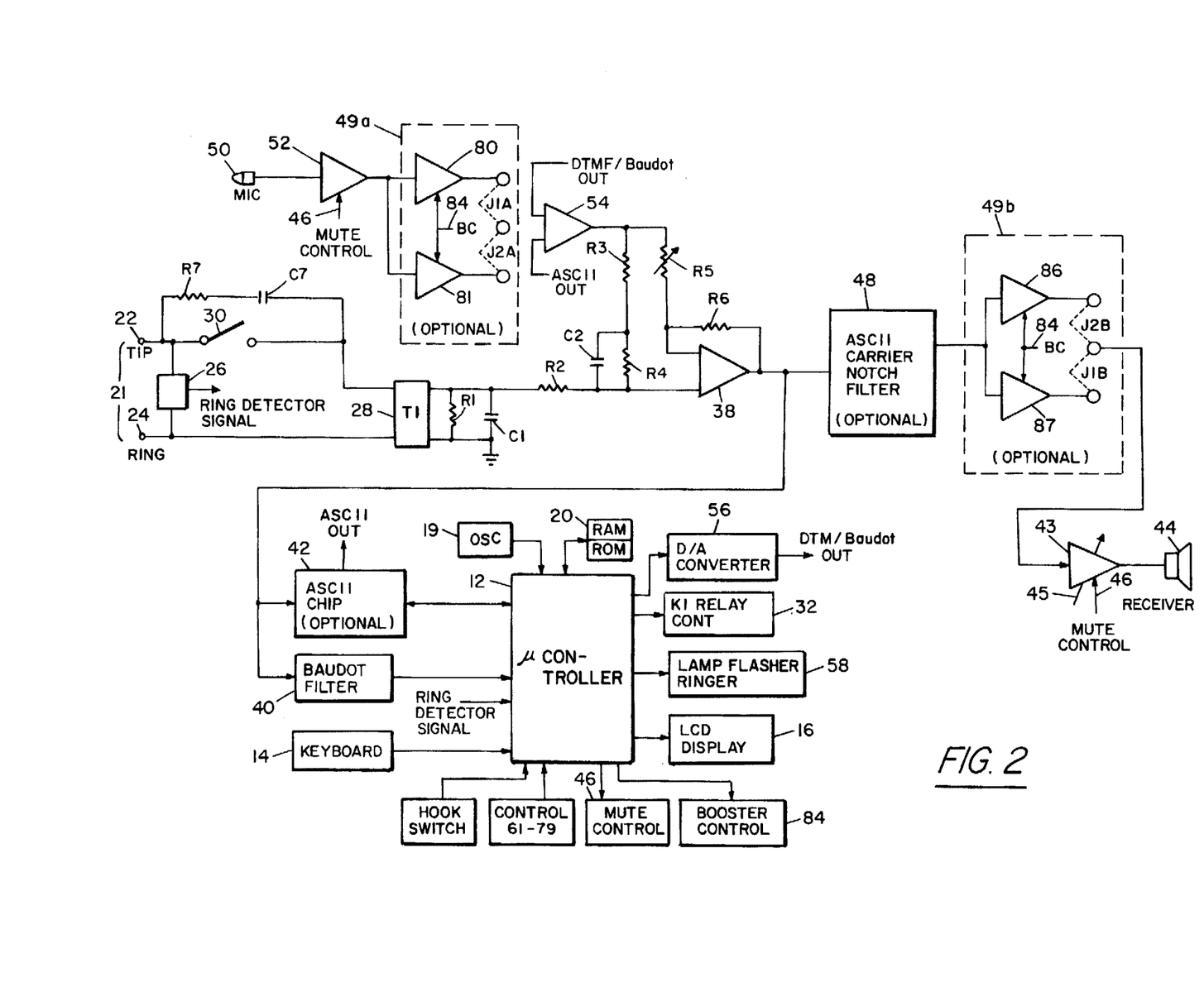
FIG. 2 is a schematic block diagram of the preferred embodiment of the telecommunications device according to the present invention.

Referring now to the drawings, and in particular to FIG. 1 and FIG. 2, a preferred embodiment of a telecommunications device 10 according to the present invention includes a microprocessor 12 connected to a telephone-style twelve-key keypad 14 to receive manual entry of alpha numeric data by the user. The keys of the keypad 14 are arranged on the face of the telecommunications device 10 in the standard four-row by three-column telephone-style keypad matrix wherein each key is labeled with specific alpha numerical symbols. As shown in FIG. 1, the keypad 14 has the alpha numerical symbols of a telephone keypad in the conventional locations on the twelve keys. In addition, the letters "Q" and "Z"are disposed below numeral one (1) key, the symbols "! $ ( ) =" are disposed below the star (*) key, the symbols ""/ '+—" are disposed under the zero (0) key and the symbols ", . ? : ; " are disposed under the pound (#) key. These additional symbols provide text characters (TTY characters) that are not displayed on the standard alpha numerical telephonic keypad and in the preferred embodiment are associated with the keys under which they are disposed. The operation of the keypad 14 as a TTY keyboard in sending text messages will be described in connection with FIG. 3.

The microprocessor 12 is also coupled to an LCD display 16 for displaying the data and messages from the microprocessor, entries from the keypad 14, and also transmitted and received text messages under the control of the microprocessor. In the preferred embodiment, the LCD display 16 displays two lines of twenty characters in each line. The forty character display in particular facilitates the viewing of longer text messages, both transmitted and received messages. As shown in FIG. 1, the LCD display 16 is disposed prominently on the face of the telecommunications device of the present invention above the key pad 14. A conventional telephone-style handset 18 is provided to allow conventional telephone voice communication.

A crystal oscillator 19 provides a clock signal to the microprocessor 12. The microprocessor 12 is coupled to a memory 20 which includes a read-only-memory (ROM) for storing program instructions and permanent data and a random-access-memory (RAM) which stores variable data and user provided data for use by the microprocessor.

The two wire "tip" and "ring" signals of the telephone line 21 are coupled to the telecommunications device 10 at terminals 22 and 24, respectively. A ring detector 26, which is coupled across the terminals 22 and 24, provides an input signal to the microprocessor 12 when a "ring signal" is present on the telephone line. Terminals 22 and 24 are coupled to the primary winding of an isolation transformer 28 with terminal 22 being coupled through a normally open relay 30. The relay 30 is under the control of microprocessor 12 as illustrated by the microprocessor output to relay control 32. The tip signal at terminal 22 is also ac coupled through a resistor R7 and a capacitor C7 connected in series across relay 30 to allow any signal on the telephone line 21 to be coupled to transformer 28 without placing a dc load on the telephone line. This allows the telecommunications device 10 to "listen" to signals on the telephone line 21 but does not produce an "off hook" signal which would interrupt the operation of other automatic answering-type communication devices on the line.

The secondary winding of transformer 28 (which provides the transformer coupled telephone signal) is coupled in parallel with resistor R1 and capacitor C1 which are connected through resistor R2 to the positive input of an amplifier 38. The output of the amplifier 38 is coupled to a Baudot signal filter 40 and an optional ASCII chip 42 (if communication by ASCII code is desired) for input to the microprocessor 12. The text messages received on the telephone line 21, which are typically Baudot code signals but may also be ASCII signals, are passed by Baudot filter 40 and ASCII chip 42 as appropriate for input to the microprocessor for decoding.

The output of amplifier 38, which is the received voice signal or text signal, is also coupled via an output amplifier 43 to the receiver 44 of the telephone. The gain of amplifier 43 may be increased up to 20 dB through a variable volume control 45 located on the right side of the front panel of the telecommunications device 10 to increase amplification of the voice signals at the handset 18. This variable volume control 45 allows a hearing-impaired person to manually adjust the volume of the received voice signal to compensate for his or her individual hearing impairment or needs.

Figure 4A:
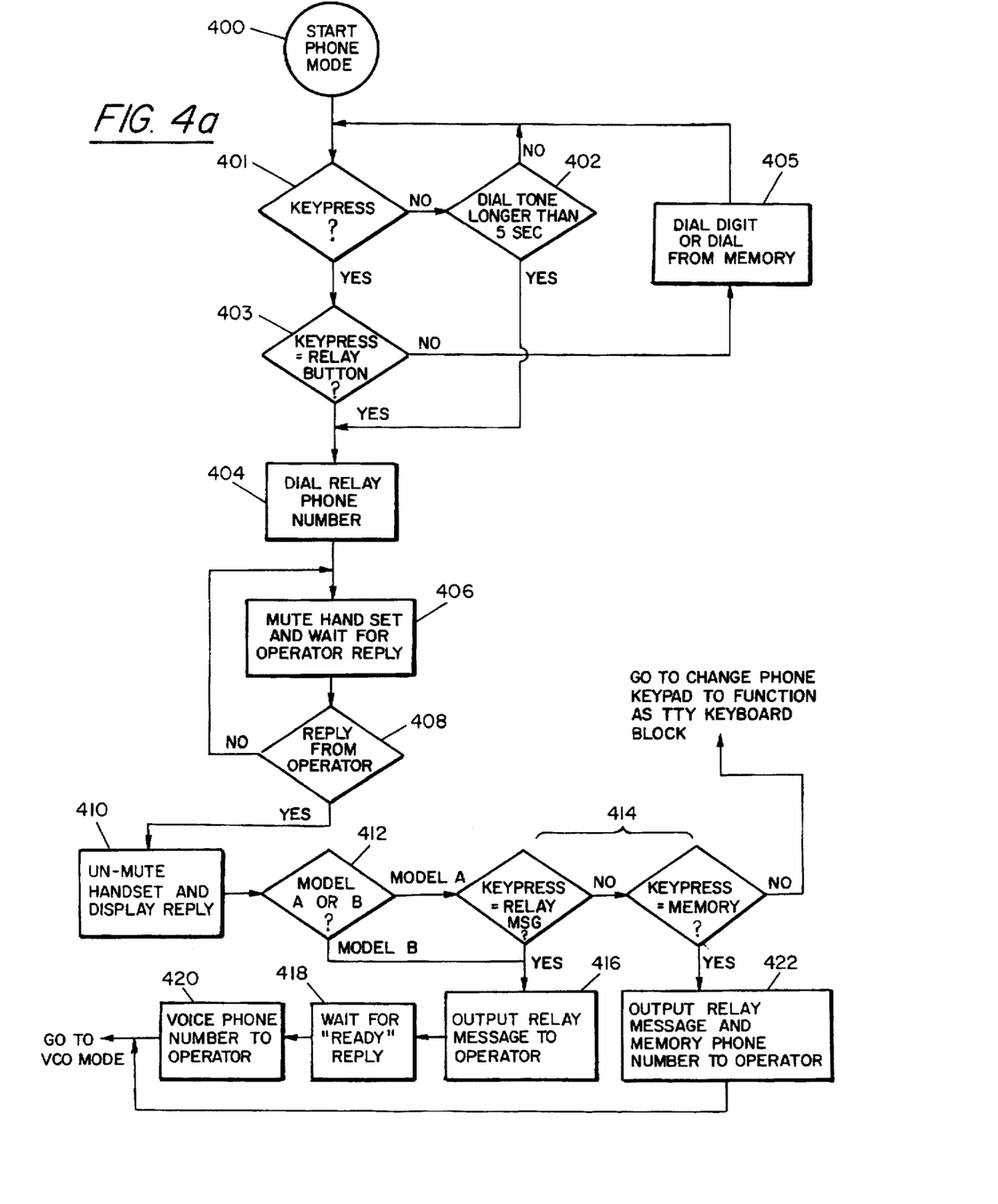
FIG. 4a is a flow diagram illustrating a preferred embodiment of the VCO feature of the present invention.

Amplifier 43 may also be muted (i.e. zero output signal) under the control of the microprocessor 12, as represented by mute control 46, to prevent Baudot signals (or ASCII signals) from reaching the receiver 44 of the handset. These text signals, which are heard as tones or beeps, are not intelligible to a listener and are often distracting and irritating. The purpose and automatic operation of the mute control will be explained hereinafter in connection with FIG. 4.

An optional ASCII carrier notch filter 48 may be disposed between the output of amplifier 38 and the input of amplifier 43. This optional ASCII carrier notch filter 48 is necessary to implement the operation of simultaneous voice and text in telecommunications device 10. Although ASCII code is presently used infrequently in TDD text communications, the use of ASCII code is anticipated for simultaneous transmission of messages in voice and text because the text information can be transmitted much faster in ASCII than in Baudot code (which is too slow for such simultaneous operation). The ASCII tone signals would greatly disrupt the ability of a user to hear a voice signal at the receiver during simultaneous voice and text reception. The ASCII carrier notch filter 48 prevents any ASCII signals from being coupled to the receiver 44 via amplifier 43 while allowing the voice signals to pass to the receiver 44 in the normal manner.

An optional gain adjustment means 49a may be disposed in the input signal path from the handset microphone 50 in conjunction with a cooperating optional gain adjustment means 49b disposed in the handset receiver 44 output path. These optional gain adjustment means 49a and 49b are provided to allow adjustment of the handset signals to compensate for the varying needs of individual hearing-impaired users and will be more fully described hereinafter.

The microphone 50 of the device handset 18 is coupled to an amplifier 52. Amplifier 52 may also be muted by mute control 46 under the control of microprocessor 12. The output of amplifier 52 is coupled to an amplifier 54 which has its output coupled to the secondary of the isolation transformer 28 via optional gain adjustment mean 49a for providing the microphone output signals to the telephone line 21.

The output of amplifier 54 is coupled to the transformer 28 via a resistor R3, which is connected via resistor R4 connected in parallel with a capacitor C2, to the resistor R2. The output of amplifier 54 is also coupled to the inverting input of amplifier 38 via a variable resistor R5. A feedback path from the output of amplifier 38 to its inverting input is provided via a resistor R6.

Resistors R1, R2, R3, R4, R5, and R6, capacitors C1 and C2, amplifier 38 and the reflected impedance of the telephone line at transformer 28 provide a telephone hybrid circuit that allows the incoming voice or incoming Baudot/ASCII signal to go from amplifier 38 either to the receiver 44 (directly or through the optional circuitry described supra) or the Baudot/ASCII filters 40 and 42. At the same time it minimizes any signal at the output of amplifier 54 coming back to the receiver 44 or the filters 40 and 42.

The proper selection of the values of resistors R1, R2, R3, R4, and capacitors C1 and C2 limits the effect of the variable impedance of the telephone line to thereby minimize feedback from microphone 50 to the receiver 44. Since resistor R1 and capacitor C1 are in parallel with the reflected impedance of the telephone line, they minimize the effect of the reflected impedance by effectively swamping it out. The resistor R2 is generally a very small resistor (0 to 300 ohms) and it further isolates the reflected impedance from the noninverting input of amplifier 38. Resistor R3, resistor R4 and capacitor C2 are selected to form a voltage divider (approximately equal to 0.5) at the non inverting input to amplifier 38.

The values of resistors R1, R2, R3, R4, and capacitors C1 and C2 are also selected to minimize the transmission of the microphone signal through amplifier 38. The goal is to make the phase angle of the signal from amplifier 54 received at the noninverting input of amplifier 38 equal to zero degrees which is in-phase with the signal at the inverting input of the amplifier 38. This allows R5 to be adjusted so that the net signal from the amplifier 54 that appears at the output of amplifier 38 is near zero. Resistor R5 can of course be a fixed resistor.

Dual tone multi-frequency (DTMF) dial signals, Baudot ouput signals, and ASCII output signals which are generated in digital form by the microprocessor 12 are also coupled to the input of amplifier 54. The output of amplifier 54 is coupled to the telephone line 21 through transformer 28. The DTMF dial signals and the Baudot code signals are converted to appropriate analog signals in a digital-to-analog converter 56 prior being input to amplifier 54. The digital ASCII signals generated by the microprocessor 12 are similarly converted to the appropriate analog signals in the ASCII chip 42 prior to being input to amplifier 54.

The telecommunications device 10 has a bright ring flasher 58 prominently located in the center bottom of the face of the device which is flashed under the control of the microprocessor 12 in response to the ring signal from the ring detector 26. A conventional telephone line signal indicator 60 indicates if there is a signal present on the telephone line.

Figure 5:
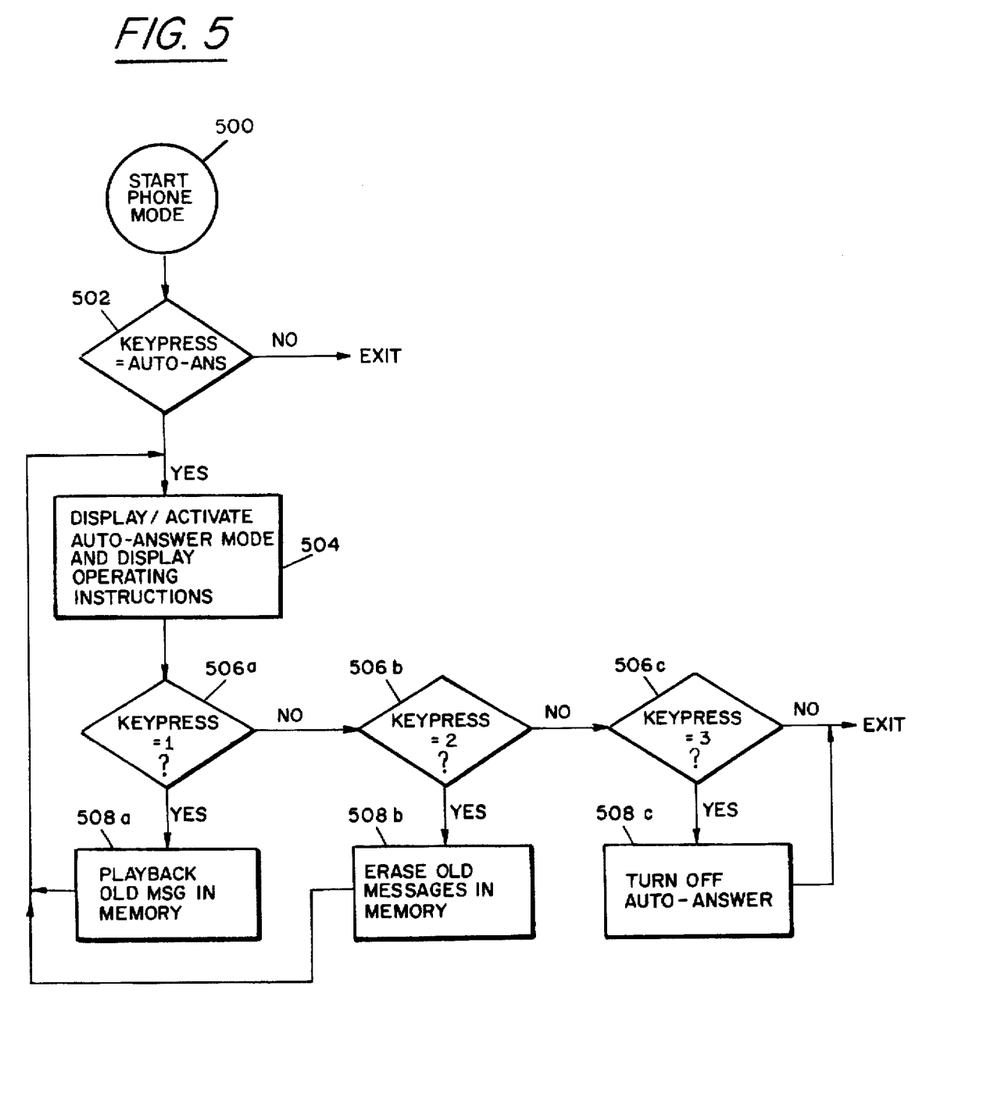
FIG. 5 is a flow diagram illustrating the user interface of the auto-answer feature of the present invention.

In addition, as shown in FIG. 1 and as will be more fully described hereinafter in connection with FIG. 5, the telecommunications device 10 has a number of specific control keys for automatically carrying out pre-programmed operations. Referring to FIG. 1, the telecommunications device 10 has a first set of keys—61, 62, 63, 64, 65 and 66—for entering control signals to initiate automatic dialing of one of a plurality of pre-programmed telephone numbers from the memory 20. Keys 61, 62, 63, 64, 65 and 66 are located at the bottom of the front panel and are labeled M1, M2, M3, M4, M5 and M6, respectively. Additional keys 68, 70, 72, 74, 76 and 78, which are labeled SELECT/SPACE (hereinafter "SELECT"), PROG/⊗, AUTO ANS, REL MSG, RELAY# and HOLD, respectively, for entering control signals to initiate specific programmed operations are located on the front panel above the key pad 14 and below the LCD display 16. The programmed operations initiated by actuation of these control signal keys 61 through 78 will be described hereinafter in connection with FIGS. 3–7.

As noted earlier, optional gain adjustment means 49a in the microphone voice input circuitry and 49b in the receiver voice output circuitry allow adjustments for the hearing and speaking capacities respectively of individual users. A BOOST key 79 is provided on the front panel for entering a control signal to initiate a gain adjustment via the optional gain adjustment means 49a and 49b. Although volume control 45 of amplifier 43 allows the gain of the received voice signals to be increased by 20 dB, some hearing-impaired individuals need even greater volume. However, when the output volume is increased beyond this range, feedback oscillation could occur from the handset receiver 44 to the handset microphone 50. This could happen if the total gain between the microphone 50 and the receiver 44 is too high.

In a second situation, the hearing-impaired user of the telecommunications device 10 has a weak speaking voice and desires amplification of his or her voice signal input through the microphone 50. However, the amplification at the microphone 50 in conjunction with 20 dB of additional gain at the receiver output, will also generate disruptive feedback oscilllation due to excessive feedback from the receiver 44 back to the microphone 50.

The output of amplifier 52 (the microphone input signal) is coupled in parallel to the input of first booster amplifier 80 and to the input of a second booster amplifier 81. The output of either amplifier 80 or amplifier 81 is coupled to the input of amplifier 54 via a jumper J1A or via a jumper J2A, respectively. Amplifier 80 has a selectable gain of 0 or +6 dB and amplifier 81 has a selectable gain of 0 or −6 dB under the control of the microprocessor 12 via a booster control 84. The microprocessor 12 selects the gain of the connected amplifier in response to a user input via the BOOST key 79 on the front panel of the telecommunications device. Actuation of the BOOST key 79 cycles the boost gain between 0 dB and + or −6 dB. Thus depending on the connection of jumper J1A or jumper J2A, the gain of the signal from the microphone 50 may be increased or decreased 6 dB under the control of the user via boost key 79 and booster control 84.

The output of amplifier 38 (the received voice signal) is coupled in parallel to the input of third booster amplifier 86 and to the input of a fourth booster amplifier 87. The output of either amplifier 86 or amplifier 87 is coupled to the input of amplifier 43 via a third jumper J2B or via a fourth jumper J1B, respectively. Amplifier 86 has a selectable gain of 0 or +6 dB and amplifier 87 has a selectable gain of 0 or −6 dB under the control of the microprocessor 12 via the booster control 84. The microprocessor 12 selects the gain of the connected amplifier in response to the user input via the BOOST key 79. Actuation of the BOOST key 79 cycles the boost gain between 0 dB and +6 dB or −6 dB Thus depending on the connection of jumper J2B or jumper J1B, the gain of the signal at the output of the receiver 44 may be increased by 6 dB or decreased 6 dB. When the boost is not activated, the gain of each boost amplifier 80, 81, 86 and 87 is 0 dB.

In practice jumpers J2A and J2B are connected when the hearing-impaired person desires an additional amplification on the received signal beyond the 20 dB provided by the volume control 45. Connection of these jumpers allows the user to increase the gain of the received voice signal by an additional 6 dB but reduces the gain at the microphone by 6 dB to maintain the same overall gain between the microphone 50 and the receiver 44. This prevents unwanted feedback oscillation. Similarly, when jumpers J1A and J1B are connected, the hearing-impaired user may increase amplification on his or her transmitted voice an additional 6 dB. Since the increased amplification of 6 dB of the microphone signal also increases the amplification of feedback due to the voice output of the receiver, the volume at the receiver is correspondingly reduced by 6 dB to maintain a net gain change of zero.

One of the features of the telecommunications device of the present invention is the capability of sending TTY messages using the telephone-style keypad 14 to input the text data. As noted earlier, this feature provides a convenient and simple way to enter text for communicating in Baudot code (or ASCII code) without the need to use a TTY keyboard which is intimidating to some users.

Figure 3:
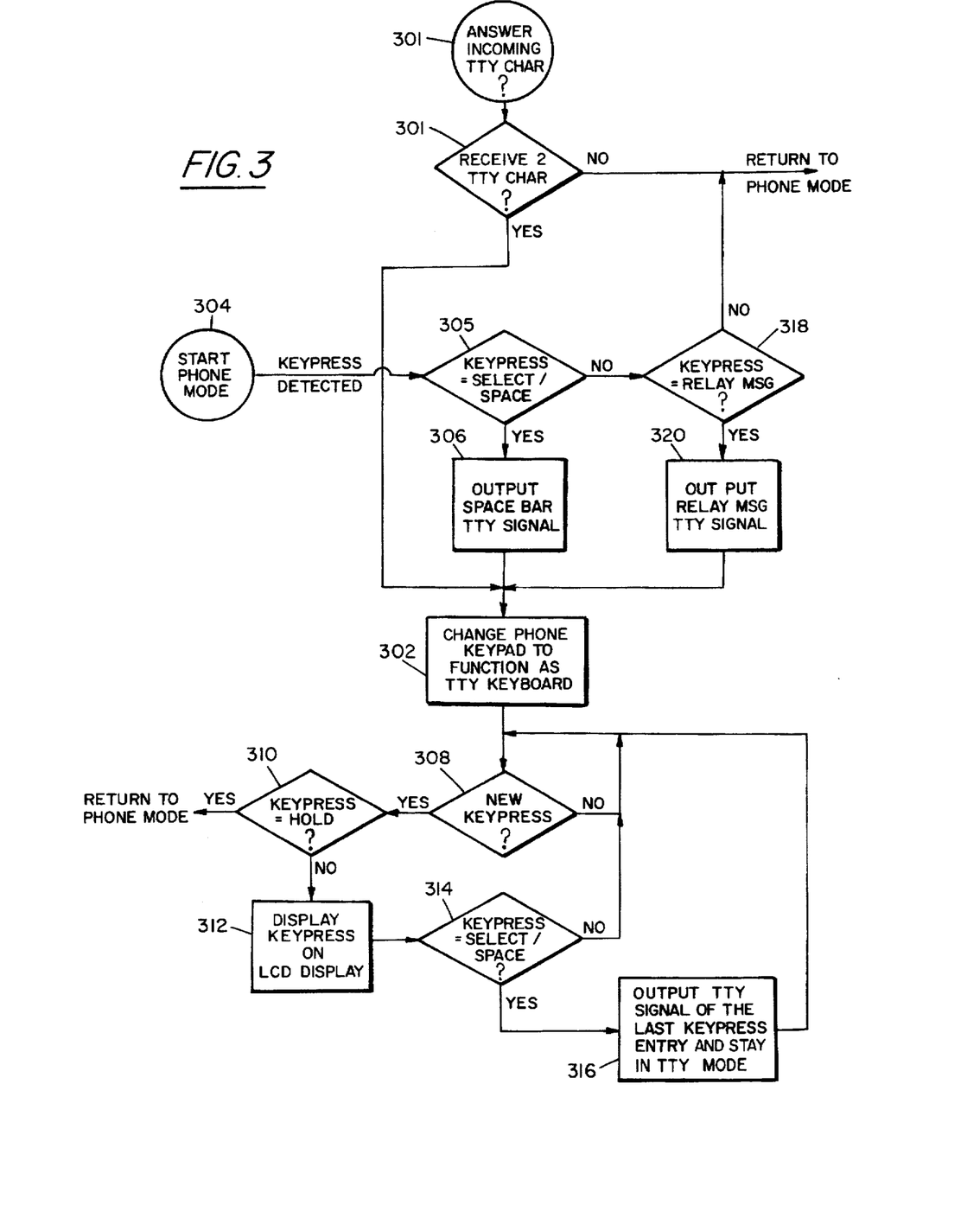
FIG. 3 is a flow diagram illustrating the operation of the telephone-style keypad as a TTY keyboard for transmitting text messages in the present invention.

Referring now to FIG. 3, there is shown a flow diagram illustrating the operation of the telephone-style keypad 14 as both a telephone input device and a TTY keyboard in the present invention. In step 300, the telecommunications device 10 has answered an incoming phone call through the auto-answer feature as will be described hereinafter in connection with FIGS. 5 and 7 or through a user manually answering the call by picking up the handset 18. As shown in FIG. 2, the incoming telephone signal is coupled through the transformer 28 and amplifier 38 to the Baudot filter 40, the ASCII Chip 42 and the handset receiver 44. In step 301, the microprocessor 12 monitors the incoming signals for the receipt of TTY characters via the Baudot filter 40 or the optional ASCII chip 42. If the microprocessor 12 detects two or more TTY characters in the incoming signal, the microprocessor jumps to a programmed subroutine in step 302 in which the inputs from the keypad 14 are interpreted as inputs from a TTY keyboard to enable the keypad to function as a TTY keyboard. This will be referred to as operating in the TTY mode. In the TTY mode, the amplifiers 43 and 52 of the handset 18 are muted for the reasons discussed in connection with FIG. 4. If at least two TTY characters are not received, the telecommunications device 10 remains in the telephone mode wherein the inputs from the keypad 14 are interpreted as inputs from a telephone keypad.

It is noted that when this description refers to the microprocessor 12 performing an action such as "monitoring" or "detecting", it is meant that programmed operations are being executed in the microprocessor to accomplish such actions.

The change of the operation of the keypad 14 from the telephone mode to the TTY mode may also be initiated manually by the user of the telecommunications device 10 by the entry of a control signal though actuation of the SELECT key 68. With the keypad 14 in the telephone mode of operation, as represented in step 304, the microprocessor 12 monitors the status of the SELECT key 68 in step 305. When actuation of the key 68 is detected, the microprocessor 12 outputs, in step 306, a "space bar" TTY signal (Baudot code) via the digital-to-analog converter 56 and amplifier 54 to the telephone line 21. In the case of ASCII operation, a space bar TTY signal is output via ASCII chip 42 and amplifier 54. Microprocessor 12 will then proceed to step 302 to change the keypad 14 to the TTY mode of operation to function as a TTY keyboard.

In step 308, the microprocessor monitors for additional inputs from the keypad 14 and the control signal keys 60-78. When a new key press is received, the microprocessor 12 checks to see if the key press is the HOLD key 78 in step 310. If the key press is from key 78, the microprocessor 12 returns the telecommunications device 10 to telephone mode and the keypad 14 operates as a telephone keypad.

If the key pressed is not the HOLD key 78, the microprocessor 12 displays the key press on the LCD display 16. When the user first depresses a key from the keypad 14, the microprocessor 12 will display one of the alpha numerical characters associated with that particular key (step 312). Upon a second depression of that same key, the microprocessor 10 will replace the displayed character with a second alpha numeric character represented by that key. For example, in the case of the key which represents the letters A, B, or C, and the numeral "2", the letter "A" will be displayed on display 16 on the first depression of that key, the letter "B" will be displayed upon the next depression, the letter "C" will be displayed on the next depression and the numeral "2" will be displayed on the following depression. Subsequent depressions of the key will cause the displayed character to cycle from "A" through "2" in a similar manner. Each of the keys of keypad 14 are displayed in LCD 16 in a similar manner under the control of the microprocessor 12.

In step 314, the microprocessor 12 continues to monitor the status of the SELECT key 68. When an alpha numerical character is shown on the display 16, actuation of the SELECT key will cause the microprocessor 12 to output the last key press entry as a TTY signal in step 316 and then jump back to step 308 to await a new key press. The transmitted character will continue to be displayed and will advanced on the display 16 as additional characters are transmitted.

After a displayed TTY character is transmitted by the depression of the SELECT key 68, a depression of the SELECT key 68 will cause a space to be transmitted as a TTY output signal. In the TTY mode, the PROG key 70 operates as a backspace command to erase an entered character from the display 16. If the SELECT key 68 is not depressed to output the displayed character or last key press, the microprocessor 12 continues to wait for the depression of a key.

When the telecommunications device 10 is in the telephone mode, a depression of RELAY MSG key 74 in step 318 will cause the microprocessor 12 to output a preprogrammed TTY relay message in step 320 and then jump to step 302 to change the keypad to TTY mode of operation. In the preferred embodiment, a "Hi, VCO call pls, GA" is outputted.

It can be seen that a simple and convenient text input mechanism is provided in the telecommunications device 10 of the present invention. The ease of use of the keypad 14 as a TTY keyboard is greatly facilitated by the technique of the present invention of the displaying the TTY character which will be outputted as the appropriate key repetitively pushed.

Referring now to flow diagram of FIG. 4a, the telecommunications device 10 automates the initiation of a voice carryover call (VCO) to a relay service by greatly simplifying the dialing of the relay phone number and automatically providing a predetermined relay message to the communication assistant of the relay service. With the telecommunications device 10 in the telephone mode as designated at step 400, the microprocessor 12 awaits a manual key press from keypad 14 or one of the individual control keys 60-78 in step 401 or a dial tone in step 402 provided by activating the telephone line 21. In the typical situation, the user initiates the VCO call by depressing the RELAY #key 76. The programmed subroutine of the microprocessor 12 recognizes this key press in step 403 and dials a preprogrammed relay service telephone number in step 404. If the key press was not the RELAY #key 76 (i.e., a digit (0-9) or a memory telephone number key 61-66 was depressed), in step 405, the microprocessor 10 dials the digit or stored telephone number in memory 20 associated with the particular memory key.

In the case where the automatic dial tone detection feature is activated (controlled by instructions stored in ROM), the microprocessor 12 monitors the dial tone and, if the dial tone is present for more than 5 seconds, the microprocessor subroutine, in an optional step, jumps to step 404 and dials the preprogrammed relay service telephone number. Thus a call to the relay service may be initiated by simply activating the telephone line 21 by the telecommunications device going "off hook".

After the number of the relay service has been dialed, in an optional step 406, the microprocessor 12 mutes the handset 18 of the telecommunications device 10 and waits for a reply from the communication assistant of the call relay service. In step 406, amplifier 52 which amplifies the transmitted signals from handset microphone 50 and amplifier 43 which amplifies the received signals for receiver 44 of the handset 18, both are muted to inhibit their output. Receiver amplifier 43 in the receiver's circuitry is muted in order to prevent undesirable Baudot or ASCII frequency tones from being amplified by the receiver and which may then disturb or annoy people in the vicinity of the receiver. For example, some relay services send a very loud tone when the call is first answered. Amplifier 52 is muted to prevent extraneous background noises picked up by the microphone from the interfering with the incoming signals from the telephone line. For example, loud talking or laughing can interfere with incoming messages. Upon receipt of a text reply (in Baudot or possibly ASCII code some time in the future) such as "Hi, This is California relay. GA" from the communications assistant, in step 408, microprocessor unmutes the handset and displays the reply from the communication assistant in step 410 on the LCD display 16.

A telecommunications device of the present invention implements one of two options, Model A or Model B (determined by instructions stored in ROM), at this point (step 412) in the relay message subroutine. In Model A, the microprocessor 12 waits for a key depression in step 414. If the RELAY MSG key 74 is then depressed by the user of the telecommunications device 10, the microprocessor 12, in step 416 outputs a preprogrammed Baudot code relay message (preferably stored in the ROM of memory 20) to the relay service such as "This a VCO call, please.", and waits, in step 418, for a Baudot code "Ready" reply from the communication assistant. This reply is displayed on the LCD display 16. The user of the telecommunications device may then in step 420, either speak the number to be called directly to the communication assistant or change the keypad 14 to the TTY mode to transmit the telephone number via Baudot code. This option allows a hearing-impaired person to speak the telephone number directly if his or her speech is easily understood or to use the text mode if there is a possibility that the communications assistant may not clearly comprehend the spoken telephone number.

The communication assistant will then proceed to complete the telephone connection. Once the connection with the other party is completed, the user of the telecommunications device may speak directly to the other party and receive the return communications via text transmission relayed by the communication assistant and displayed on LCD display 16.

If a Memory key 61–66 is depressed in step 414 by the user of the telecommunications device 10, the microprocessor 12, in step 422 outputs a preprogrammed Baudot code relay message to the call relay service which includes the telephone number (stored in the RAM of memory 20) associated with the particular memory key such as "This a VCO call. Please dial—." This message is preferably stored in the ROM of memory 20 and combined with the stored telephone number prior to outputting the combined message to the telephone line. As before, the communication assistant will then proceed to complete the telephone connection. Once the connection with the other party is completed, the user of the telecommunications device may speak directly to the other party and receive the return communications via text transmission relayed by the communication assistant and displayed on LCD display 16. This is a two-button initiation process.

If neither the RELAY MSG key 74 not the Relay #key 76 are depressed, the user of the telephone may convert to the TTY mode of operation as described in connection with FIG. 3.

In Model B, upon detecting and displaying the text reply such as "Hi, This is California relay. GA" from the communications assistant in step 410 and unmuting the handset, the microprocessor 12 jumps to step 416 to automatically output the stored preprogrammed Baudot code relay message "This a VCO call, please." to the call relay service. As in the Model A embodiment, the programmed operation then proceeds through steps 418 and 420. Thus, Model B only requires a one-button access control.

However, if the automatic dial tone detection feature is also enabled with Model B, the entire process of dialing the relay service as well as sending out the request message "Hi, VCO call, please, GA." would require absolutely no button activation.

Figure 4B:
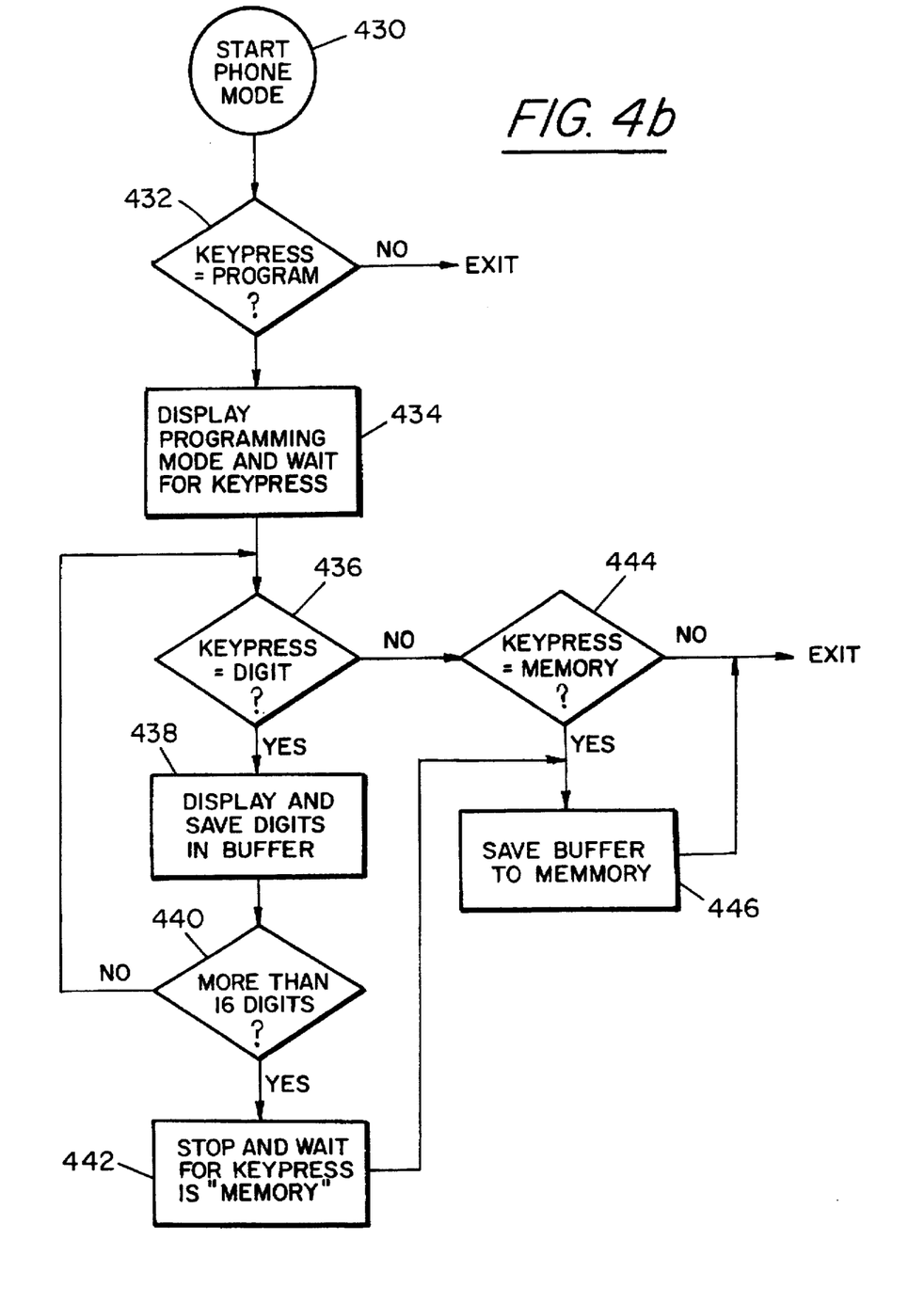
FIG. 4b is a flow diagram illustrating the operation of the present invention in programming a telephone number into memory.

FIG. 4b is a flow diagram illustrating the operation of the telecommunications device in entering a telephone number into the memory 20 to be associated with one of the memory keys—60, 61, 62, 63, 64, 65 and 66 (i.e. M1, M2, M3, M4, M5 and M6 respectively). Starting with the keypad 14 in the telephone mode at step 430, the microprocessor 12 monitors for a key press of the PROG key 70 in step 432. Upon detecting the depression of the PROG key 70, "Programming Mode" is displayed on the LCD 16 and the microprocessor waits for the next Keypress in step 434. If the next key press is a digit (step 436), the microprocessor 12 displays the digit on the LCD and saves the digit to a buffer memory of the microprocessor in step 438. Steps 436 and 438 may be repeated until 16 digits are displayed and entered into buffer memory at step 440. After the desired telephone number of up to 16 digits has been entered into the buffer memory, the microprocessor waits for a key press of a memory key at 442. A key press of one of the memory keys 60, 61, 62, 63, 64, 65 and 66 at step 444 will save the buffer context (i.e., the telephone number), in step 446, to the memory location associated with the memory key which was depressed. As indicated by the flow from step 436 to step 444, the data in the buffer memory may be saved to a memory key at any point.

The telecommunications device 10 of the present invention includes an auto-answer mode for receiving and recording text messages. The flow diagram of FIG. 5 illustrates the initiation of auto-answer mode of operation. With the telecommunications device 10 in the telephone mode as indicated at 500, the user may activate auto-answer operation by depressing the auto-answer key 72. The microprocessor 12 recognizes the depression of key 72 in step 502. In step 504, the microprocessor 12 activates the auto-answer mode and displays the phrase "Auto Answer On" on the first line of LCD display 16. On the second line of LCD 16, the microprocessor 12 displays operating instructions—"1= Read 2=Erase 3=Off"—to inform the user of the appropriate action to take to play back any messages in memory, erase messages in memory, or deactivate auto-answer mode. The microprocessor 12 waits as indicated at 506a–506c for the depression of the numerals 1, 2, or 3 on the keypad 14 to initiate the appropriate action in step 508a–508c and either exit auto-answer mode or return to step 504.

When the auto-answer mode in activated, the TTY messages received by the telecommunications device 10 are stored in the RAM portion of memory 20 for retrieval and display under the control of the programmed microprocessor.

Figure 6A:
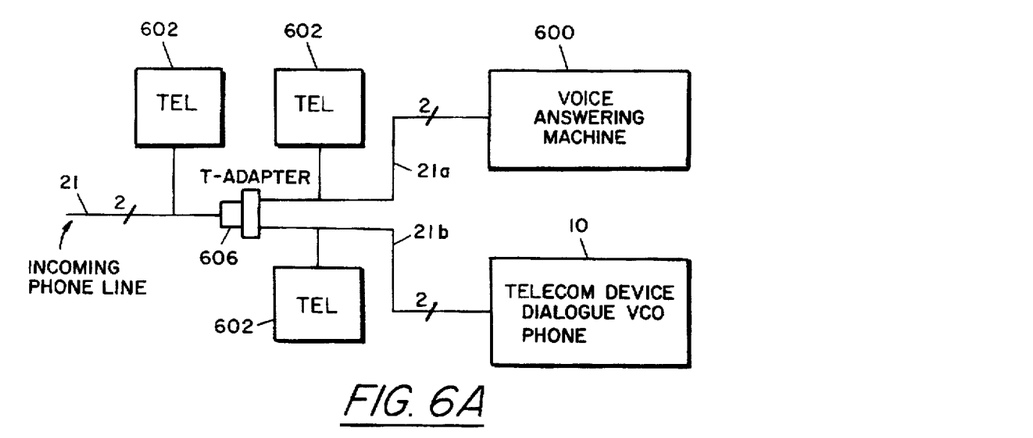
FIGS. 6a and 6b are schematic block diagrams illustrating the connection of the telecommunications device of the present invention on a single telephone line with other communication devices.
Figure 6B:
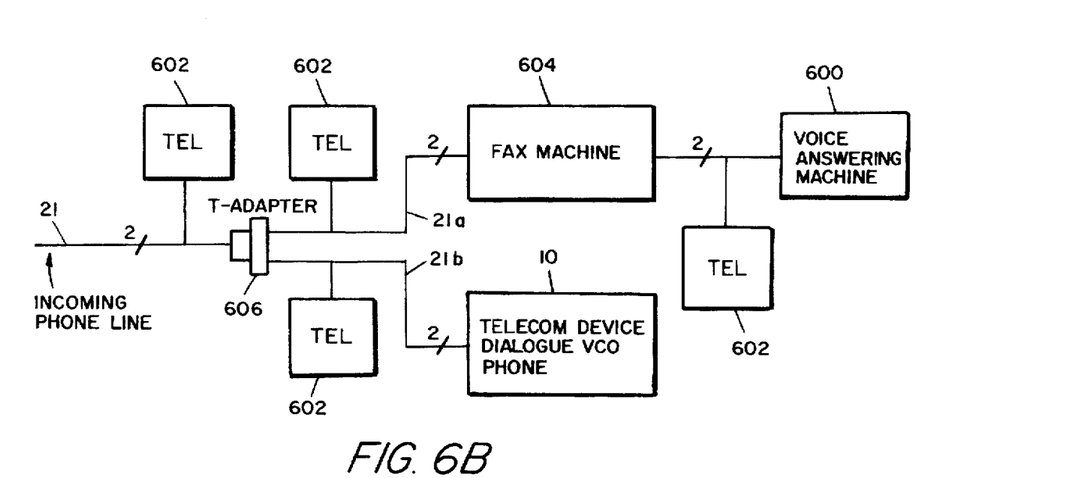
Figure 7:
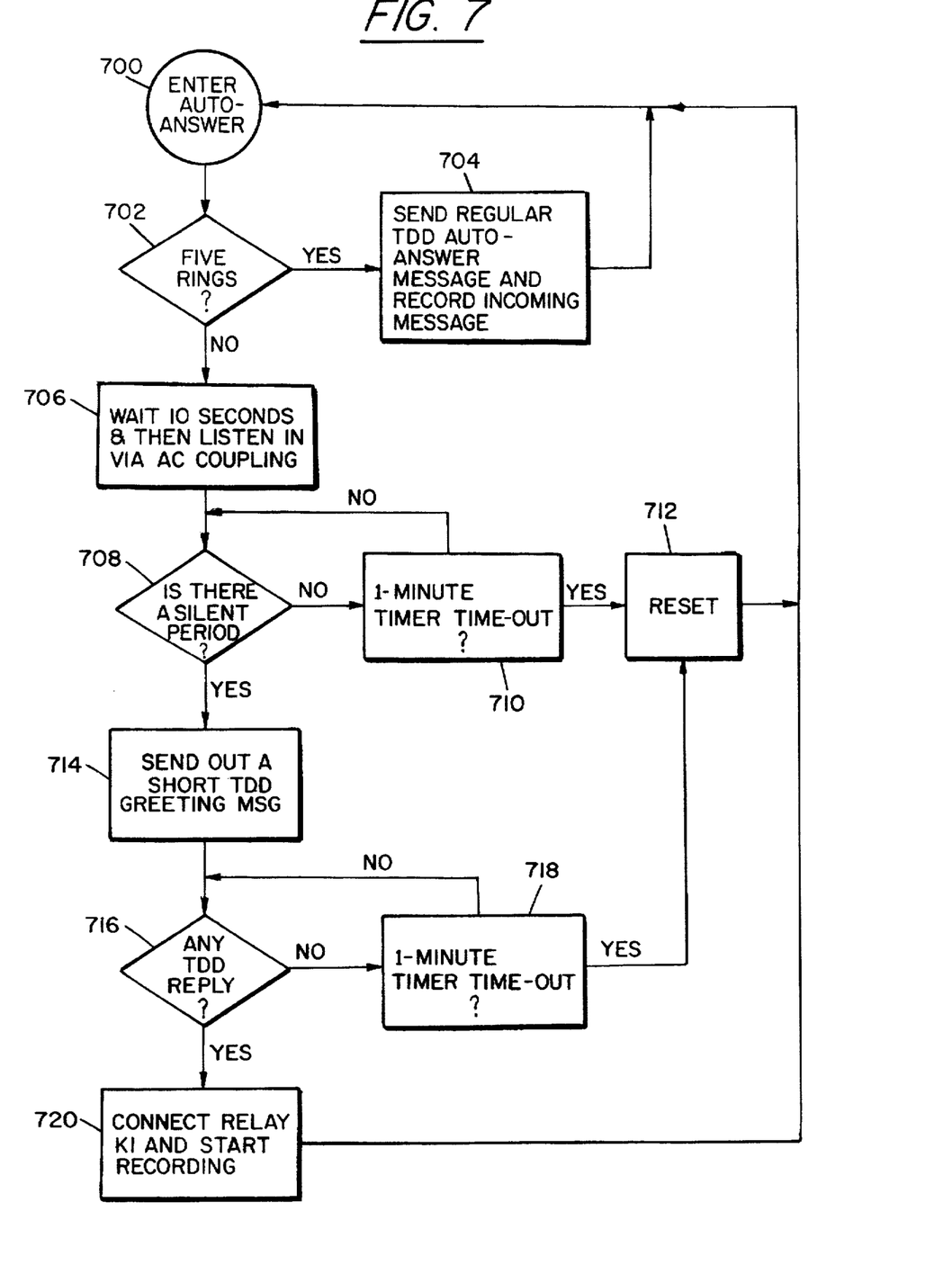
FIG. 7 is a flow diagram illustrating the operation of the auto-answer feature for recording text messages of the present invention on the same telephone line with a voice answering machine, a fax machine, and other telephones.

FIGS. 6a, 6b and 7 illustrate that auto-answer feature of telecommunications device 10 of the present invention may be operated on a single telephone line with a voice answering machine 600, other telephones 602, and a facsimile machine 604. Referring to FIG. 6a which illustrates the connections of the telecommunications device 10 with auto-answer, a voice answering machine 600 and telephones 602 to the single telephone line 21. The telephone line 21 is coupled to a T-adapter 606 to split the two-wire telephone line into parallel two-wire paths 21a and 21b. The telecommunications device 10 is coupled to one path 21a and the voice answering machine 600 is coupled to path 21b. Voice telephones 602 may be connected at various places in the paths as indicated by the various locations in the Figure.

FIG. 6b illustrates the connections of the telecommunications device 10 with auto-answer, a facsimile machine 604, a voice answering machine 600 and telephones 602 to the single telephone line 21. The telephone line 21 is coupled to a T-adapter 606 to split the two-wire telephone line into parallel two-wire paths 21a and 21b. The telecommunications device 10 is coupled to path 21a and the facsimile machine 604 is coupled to path 21b. The voice answering machine 600 is coupled to path 21b serially through the facsimile machine 604. The facsimile machine 604 must be of the type which is capable of sending ring signals to a connected voice answering machine and the voice answering machine 600 must be of the type which automatically disconnects when an extension is picked up. Voice telephones 602 may be connected at various places in the paths as indicated by the various locations in the Figure.

FIG. 7 illustrates the programmed operation of the telecommunications device that enables the present invention to operate as a text answering/recording device on the same line and at the same time with the other units 600–604. Step 700 indicates that the telecommunications device 10, connected as shown in FIGS. 6a and 6b, is in the auto-answer mode as discussed in connection with FIG. 5. Turning first to operation of the telecommunications device 10 when no facsimile machine is present as in FIG. 6a, the voice machine 600 is set to answer in less than five rings. Telecommunicationn device 10 with auto-answer is factory set for answering at five rings. When there is an incoming ring signal on the telephone line 21, the voice machine 600 answers the call first. If the call is not a voice call, after the voice answering machine transmits its answering voice message, it will wait a period of approximately 5–10 seconds for the calling party to leave a voice message. If no voice message is received within the waiting period, the answering machine will recognize this fact and disconnect.

The microprocessor 12 detects the number of rings of an incoming call via the ring detector 26. In step 706, the microprocessor 12 waits for ten seconds and then listens to the incoming telephone signal via the AC coupling provided by resistor 34 and capacitor 36. By listening via the AC coupling, the telecommunications device 10 does not answer the call by going "off hook" and thereby prevent the voice answering machine 600 from answering. If the call has not been answered after five rings by one of the other devices on the line, the telecommunications device 10 answers the telephone call as indicated in step 702 by closing relay 30. In step 704, the microprocessor 12 will output a regular TTY auto-answer message via the digital-to-analog converter 56 to the telephone line 21 and, after text communications have been established, record any incoming message in memory 20.

The telecommunications device 10 operates as follows during the period between the first ring and fifth rings. In step, 702, microprocessor 12 monitors the actual number of rings detected. If it has determined that the ringing stops before the fifth ring, it assumes another answering machine has answered the call. The microprocessor 12 starts listening through the ac coupling for a period of silence (i.e. no voice frequency signals on the telephone line for at least 2 seconds) on the telephone line 21 in step 708. If the microprocessor has not detected a silent period on the telephone line after one minute as indicated at step 710, the microprocessor 12 operates as if the call has indeed been received by another on-line machine and in step 712 resets the auto-answer mode to the initial step 700. If there is a silent period of two seconds or greater, in step 714 the microprocessor 12 outputs a short TTY greeting message on the telephone line 21. The greeting message is kept very short in order to not seriously disturb the voice recording process on the telephone line if the silent period has just been related to a pause in the middle of an outgoing/incoming voice message.

In step 716, the microprocessor 12 waits for any TTY reply to the greeting message output in step 714. If there is no TTY reply message detected for one minute as represented by step 718, the microprocessor 12 jumps to step 712 to reset the auto-answer routine and returned to initial step 700. If a TTY reply is detected via the ac coupling in step 716, it is assumed that the present call is in fact a TTY call and, in step 720, the microprocessor engages relay 30 to couple the signal on the telephone line 21 to be input to the microprocessor through the Baudot filter 40 or ASCII chip 42. After text communications are established, the microprocessor starts recording the TTY signal in memory 20.

Turning now to operation of the telecommunications device 10 with a voice answering machine 600 and a facsimile machine 604 connected as shown in FIG. 6b, the facsimile machine 604 is set to answer in two rings or less. When there is an incoming ring signal on the telephone line 21, the facsimile machine 604 answers the call first. If the call is not a facsimile call, after approximately five to fifteen seconds the facsimile machine 604 recognizes this fact and starts sending internally generated ringing signals to the voice answering machine 600. At the same time the facsimile machine 604 provides simulated rings back to calling party. The voice answering machine 600 may then answer the call.

The telecommunications device 10 now operates in the same manner as it did when the facsimile machine was not present. After the microprocessor 12 detects that ringing was stopped before the fifth ring via the ring detector 26 (in step 702), it waits in step 706 for ten seconds and then listens to the incoming telephone signal via the AC coupling provided by resistor 34 and capacitor 36. By listening via the AC coupling, the telecommunications device 10 does not answer the call by going "off hook" and thereby prevent any other on-line device from answering. If the call has not been answered after five rings by one of the other devices on the line (that implies other devices are not set for auto-answer), the telecommunications device 10 answers the telephone call as indicated in step 702 by closing relay 30. In step 704, the microprocessor 12 will output a regular TTY auto-answer message via the digital-to-analog converter 56 to the telephone line 21 and, after text communications have been established, record any incoming message in memory 20.

Again in step 702, microprocessor 12 monitors the actual number of rings detected. If it has determined that the ringing stops before the fifth ring, it assumes another answering machine has answered the call. The microprocessor 12 starts listening through the ac coupling for a period of silence (i.e. no voice frequency signals on the telephone line for at least 2 seconds) on the telephone line 21 in step 708. If the microprocessor 12 has not detected a silent period on the telephone line after one minute as indicated at step 710, the microprocessor 12 operates as if the call has indeed been received by another on-line machine and in step 712 resets the auto-answer mode to the initial step 700. If there is a silent period of two seconds or greater, in step 714 the microprocessor 12 outputs a short TTY greeting message on the telephone line 21. The greeting message is kept very short in order to not seriously disturb the voice recording process on the telephone line if silent period has just been related to a pause in the middle of an outgoing/incoming voice message.

In step 716, the microprocessor 12 waits for any TTY reply to the greeting message output in step 714. If there is no TTY reply message detected for one minute as represented by step 718, the microprocessor 12 jumps to step 712 to reset the auto-answer routine and returned to initial step 700. If a TTY reply is detected via the ac coupling in step 716, it is assumed that the present call is in fact a TTY call and, in step 720, the microprocessor engages relay 30 to couple the signal on the telephone line 21 to be input to the microprocessor through the Baudot filter 40 or ASCII chip 42. After text communications are established, the microprocessor starts recording the TTY signal in memory 20.

Obviously many modifications and variations of the present invention are possible in light of the above teachings. It is therefore to be understood that within the scope of the appended claims, the invention may be practiced otherwise than as specifically described.

We claim:

1. A telecommunications device for providing voice and text telephone communication over a common telephone line comprising:

transmission means for sending and receiving voice and TTY messages over said telephone line;

a microprocessor for performing programmed operations;

a multiple key telephone-style keypad for entering data into said microprocessor;

said programmed operations of said microprocessor selectively interpreting data entered from said keypad as dial signals in a telephone mode and TTY characters in a TTY mode;

display means for displaying received TTY messages and data entered from said keypad;

at least one data entry means for providing a control signal to said microprocessor to change the operation of said programmed operations between said telephone mode and said TTY mode;

means for automatically making voice carryover calls;

means for automatically answering and recording text messages, and memory means connected to said microprocessor, said memory means stores data and program instructions to be performed by said microprocessor, said programmed operations performed by said microprocessor automatically answer text telephone calls such that said telecommunications device can be connected to said telephone line with at least one of a voice telephone answering machine and a facsimile machine, said programmed operations comprising:

a) monitoring said telephone line for a ring signal;

b) after detecting ringing has stopped on said telephone line, waiting for a first predetermined duration of time;

c) after said first predetermined duration of time, monitoring, for a second predetermined duration of time, said telephone line for voice signals through ac coupling to said telephone line for a silent period of predetermined duration in which no voice signals have been received;

d) upon recognizing said silent period, outputting a text message to said telephone line;

e) monitoring said telephone line for a text reply message in response to said outputted text message for a third predetermined duration; and f) upon receiving a text reply message, coupling said telephone line to said microprocessor and recording any incoming text message to said memory means.

2. The telecommunications device recited in claim 1 including, amplifier means for selectively adjusting the amplification of voice messages received and sent by said transmission to provide maximum amplification of at least one of said voice messages received and sent over said telephone line without producing feedback oscillation.

3. The telecommunications device as recited in claim 2 comprising:

said amplifier means includes first amplification means selectively increasing the amplification of a received voice message to a level beyond the level normally causing feedback oscillation due to feedback of the signal to the means for sending messages; and second amplification means for selectively reducing the amplification of signals which have been received by the means for sending messages to the level which does not cause feedback oscillation.

4. The telecommunications device recited in claim 1 wherein, said multiple key telephone-style keypad is operative for entering alpha numerical and text characters into said microprocessor, each key of said keypad represents a plurality of predetermined alpha numerical characters, and said display means is operative for displaying alpha numerical data.

5. The telecommunications device recited in claim 1 including, digital-to-analog converter means for converting digital output signals from said microprocessor to analog signals, said at least one data entry means is connected to supply a first control signal to said microprocessor so that said programmed operations interpret said first control signal as indicating that a text message will be entered from said keypad;

repetitively actuating a key of said keypad for entering a desired character associated with said key into said microprocessor;

said programmed operations sequentially displays the characters associated with said actuated key on said display means in response to the repetitive actuation of said key;

said at least one data entry means is connected to supply a second control signal to said microprocessor to cause said displayed character to be supplied to said telephone line.

6. The telecommunications device recited in claim 5 wherein, said characters supplied to said telephone line are displayed on said display means in the order that said characters were supplied to said telephone line.

7. The telecommunications device recited in claim 5 wherein, said first and second control signals are entered into said microprocessor from the same one of said at least one entry means.

8. The telecommunications device recited in claim 1 having the capability of sending and receiving voice and text transmissions including, a microphone input, a speaker output for voice operation, the improvement comprising a programmed operation of said microprocessor for contacting a relay service for implementing a voice carryover call wherein:

a first control signal from said at least one entry means is entered into said microprocessor; and said programmed operations of said microprocessor respond to said first control signal to (1) dial the telephone number of said relay service, (2) to monitor said telephone line by said microprocessor for a return message from said relay service; and (3) to transmit a predetermined voice carryover announcement in text to said telephone line after receipt of said return message.

9. The telecommunications device recited in claim 8 wherein:

said programmed operations of said microprocessor respond to said first control signal to dial the telephone number of said relay service;

said programmed operations of said microprocessor monitor said relay service to determine if a text response signal is provided thereby, upon receiving a text response from said relay service, entering said second control signal from said at least one entry means into said microprocessor; and said programmed operations of said microprocessor respond to said second control signal to automatically send a predetermined voice carryover announcement in text to said telephone line.

10. The telecommunications device recited in claim 9 wherein:

said predetermined voice carryover announcement in text to said telephone line includes a telephone number to be called by the relay service.

11. The telecommunications device recited in claim 9 including;

means for muting the microphone input and the speaker output of the telecommunications device until a text response is received from said relay service.

12. The telecommunications device recited in claim 1 wherein, if no silent period has been detected for said second predetermined duration of time, said programmed operations of said microprocessor comprises:

resetting said programmed operations.

13. The telecommunication device recited in claim 12 wherein, said microprocessor includes a programmed operation which detects when five ring signals are received, and then produces a predetermined auto-answer text message and records any incoming text message to said memory means.

14. A telecommunications device for providing voice and text telephone communication over a common telephone line comprising:

means for sending and receiving voice and TTY messages over said telephone line;

a microprocessor for performing programmed operations;

a twelve key telephone-style keypad for entering data into said microprocessor;

said programmed operations of said microprocessor selectively interpreting data entered from said keypad as dial signals in a telephone mode and TTY characters in a TTY mode;

display means for displaying received TTY messages and data entered from said keypad;

at least one data entry means for providing a control signal to said microprocessor to change the operation of said programmed operations between said telephone mode and said TTY mode;

means for automatically making voice carryover calls; and means for automatically answering and recording text messages; and means for optimizing the coupling of a microphone signal produced by said microprocessor to said telephone line presenting a reflected impedance to said telecommunications device, and minimizing the coupling of said microphone signal to a receiver of said telecommunications device, comprising:

a first resistor and a first capacitor connected in parallel with the reflected impedance of said telephone line to minimize the effect of said reflected impedance;

a second resistor connected in series with the parallel connection of said first resistor, said first capacitor and said reflected impedance;

an operational amplifier having a positive input terminal and a negative input terminal;

a third resistor and a second capacitor connected in parallel with each other, a first side of said third resistor and second capacitor connected to said second resistor and to the positive input terminal of said amplifier;

the microphone signal also being coupled to a second side of said third resistor and said second capacitor, the first side of said third resistor and second capacitor also being coupled to the positive input terminal of said amplifier; and a fourth resistor connected to supply said microphone signal to said negative input terminal of said amplifier.

15. A telecommunications device for providing voice and text telephone communication over a common telephone line comprising:

means for sending and receiving voice and TTY messages over said telephone line;

microprocessor means for performing programmed operations;

data entering means for selectively entering data into said microprocessor means;

said microprocessor means operative to selectively interpret data entered from said data entering means as dial signals in a telephone mode and TTY characters in a TTY mode in response to said programmed operations;

means for providing a control signal to said microprocessor means to change the operation of said programmed operations between said telephone mode and said TTY mode;

means for automatically answering and recording text messages, and memory means connected to said microprocessor means, said programmed operations performed by said microprocessor means automatically answer text telephone calls such that said telecommunications device can be connected to said telephone line with at least one of a voice telephone answering machine and a facsimile machine, said programmed operations comprising:

a) monitoring said telephone line for ring signals;

b) waiting for a first time period after detecting that ring signals on said telephone line have stopped;

c) after said first time period, monitoring said telephone line for a second time period to determine if voice signals have been received on said telephone line;

d) initiating the application of a text message to said telephone line in the absence of voice signals on said telephone line during said second time period;

e) monitoring said telephone line for a third time period for a text reply message in response to said text message; and f) upon receiving a text reply message, coupling said telephone line to said microprocessor means and recording any incoming text message to said memory means.

16. The telecommunications device recited in claim 15 wherein, said microprocessor means resets said programmed operation when voice signals have been detected during said second predetermined duration of time.

17. A telecommunications device for providing voice and text telephone communication over a common telephone line comprising:

transmission means for sending and receiving voice and TTY messages over said telephone line;

a microprocessor for performing programmed operations to selectively interpret signals on said transmission means as dial signals in a telephone mode and TTY characters in a TTY mode;

control means for providing a control signal to said microprocessor to change the operation of said programmed operations between said telephone mode and said TTY mode; and coupling means for optimizing the coupling of a microphone signal produced by said microprocessor to said telephone line and minimizing the coupling of said microphone signal to a receiver of said telecommunications device, comprising:

a first resistor and a first capacitor connected in parallel and to said telephone line to minimize the effect of the reflected impedance of said telephone line;

a second resistor connected in series with the parallel connection of said first resistor and said first capacitor;

amplifier means having inverting and non-inverting input terminals;

a third resistor and a second capacitor connected in parallel with each other;

said third resistor and said second capacitor connected to said second resistor and to the non-inverting input terminal of said amplifier means;

said third resistor and said second capacitor further connected to receive said microphone signal; and a fourth resistor connected to supply said microphone signal to said inverting input terminal of said amplifier means.

18. The method of operating a telecommunications device for providing voice and text telephone communication over a common telephone line such that said telecommunications device can be connected to said telephone line with at least one of a voice telephone answering machine and a facsimile machine, comprising the steps of:

sending and receiving voice messages and TTY messages over said telephone line;

monitoring said telephone line for a ring signal;

after detecting that ring signals have stopped on said telephone line, waiting for a first predetermined duration of time;

after said first predetermined duration of time, monitoring said telephone line through ac coupling for voice signals during a second predetermined duration of time;

upon recognizing a silent period of predetermined duration in which no voice signals are received during said second predetermined duration of time, supplying a text message to said telephone line;

monitoring said telephone line for a text reply message in response to said text message for a third predetermined duration; and upon receiving a text reply message, coupling said telephone line to a recording device for recording any incoming text message.

19. The method recited in claim 18 including the step of:

resetting the operation if no silent period has been detected for said second predetermined duration of time.

20. The method recited in claim 18 including the step of:

producing a predetermined auto-answer text message when five ring signals are detected and recording any incoming text message.

21. A telecommunications device for providing voice and text telephone communication over a common telephone line comprising:

microphone means for sending voice and TTY messages over said telephone line;

receiver means for receiving voice and TTY messages over said telephone line;

a microprocessor for performing programmed operations for selectively interpreting messages on said telephone line as dial signals in a telephone mode and TTY characters in a TTY mode;

data entry means for providing a control signal to said microprocessor to select the operation of said programmed operations between said telephone mode and said TTY mode; and circuit means for optimizing the coupling of said microphone means to said telephone line by reduciing the effect of the reflected impedance of said telephone line relative to said telecommunications device and minimizing feedback coupling of said microphone means to said receiver means of said telecommunications device, said circuit means comprising:

first impedance network means connected in parallel with the reflected impedance of said telephone line to minimize the effect of said reflected impedance;

first resistor means connected in series with said first impedance network means;

amplifier means having first and second input terminals;

second impedance network means connected to said first resistor and to said first input terminal of said amplifier means;

said first input terminal of said amplifier means connected to said microphone means via said second impedance network means; and second resistor means connected to supply said microphone signal to said second input terminal of said amplifier means.

* * * * *